United States Patent
Gusikhin et al.

(10) Patent No.: US 9,121,710 B2
(45) Date of Patent: Sep. 1, 2015

(54) USER INTERFACE SYSTEM AND METHOD BASED ON CALENDAR EVENT

(71) Applicant: Ford Global Technologies, LLC, Dearborn, MI (US)

(72) Inventors: Oleg Yurievitch Gusikhin, West Bloomfield, MI (US); David Allen Kowalski, Toledo, OH (US); Perry Robinson MacNeille, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 83 days.

(21) Appl. No.: 13/801,584

(22) Filed: Mar. 13, 2013

(65) Prior Publication Data

US 2014/0278089 A1   Sep. 18, 2014

(51) Int. Cl.
*G01C 21/00* (2006.01)
*G01C 21/36* (2006.01)

(52) U.S. Cl.
CPC .............. *G01C 21/00* (2013.01); *G01C 21/362* (2013.01); *G01C 21/3691* (2013.01)

(58) Field of Classification Search
CPC ... G01C 21/00; G01C 21/362; G01C 21/3691
USPC ................................................. 701/533, 201
See application file for complete search history.

(56) References Cited

U.S. PATENT DOCUMENTS

| | | | |
|---|---|---|---|
| 7,013,205 B1 | 3/2006 | Hafner et al. | |
| 7,080,019 B1 * | 7/2006 | Hurzeler | 705/6 |
| 7,928,693 B2 | 4/2011 | Hafner et al. | |
| 8,190,359 B2 * | 5/2012 | Bourne | 701/410 |
| 2008/0319653 A1 * | 12/2008 | Moshfeghi | 701/208 |
| 2009/0005963 A1 * | 1/2009 | Jarvinen | 701/201 |
| 2010/0017249 A1 | 1/2010 | Fincham et al. | |
| 2010/0299010 A1 | 11/2010 | Balmy | |
| 2011/0077854 A1 | 3/2011 | Fushiki et al. | |
| 2011/0106592 A1 | 5/2011 | Stehle et al. | |
| 2011/0202216 A1 | 8/2011 | Thai-Tang et al. | |
| 2011/0224868 A1 | 9/2011 | Collings, III et al. | |
| 2011/0238457 A1 | 9/2011 | Mason et al. | |
| 2011/0246004 A1 | 10/2011 | Mineta | |
| 2012/0316763 A1 * | 12/2012 | Haynes et al. | 701/117 |

FOREIGN PATENT DOCUMENTS

| | | |
|---|---|---|
| EP | 1944724 A1 * | 7/2008 |
| WO | 2010043833 A1 | 4/2010 |

OTHER PUBLICATIONS

Ford Focus BEV Battery Electric Vehicle—Intro Video, http://www.youtube.com/watch?v=3UDm3bgrJIA, as uploaded Mar. 26, 2011, pp. 1 screenshot.
ICT for the Fully Electric Vehicle Research Needs and Challenges Ahead, European Commission Information Society and Media, pp. 1-50, Dec. 2010, 1st edition.
http://gm-volt.com/2010/01/06/chevy-volt-iphone-blackberry-and-droid-apps-unveiled/, Chevy Volt iPhone, Blackberry, and Droid Apps Unveiled, as retrieved Oct. 25, 2011, pp. 1-3.

* cited by examiner

*Primary Examiner* — Mary Cheung
*Assistant Examiner* — Michael Berns
(74) *Attorney, Agent, or Firm* — Jennifer M. Stec; Brooks Kushman P.C.

(57) ABSTRACT

A vehicle interface system and method is provided. The system and method includes an interface for communicating with a vehicle user. A controller is in communication with the interface and configured to retrieve a calendar event and verify the calendar event based on an input from the user via the interface. Trip information is generated based on the calendar event and vehicle data. Trip information, based on the calendar event and vehicle data, is communicated to the user via the interface.

20 Claims, 3 Drawing Sheets

USER INTERFACE SYSTEM AND METHOD BASED ON CALENDAR EVENT

TECHNICAL FIELD

The present disclosure relates to a conversational user interface system and method for trip planning based on a calendar.

BACKGROUND

All vehicles, whether passenger or commercial, include a number of gauges, indicators, and various other displays to provide the vehicle operator with information regarding the vehicle and its surroundings. With the advent of new technologies, such as hybrid electric vehicles (HEVs), plug-in hybrid electric vehicle (PHEVs) and battery electric vehicles (BEVs), has come a variety of new gauges and information displays that help guide drivers to better learn, understand and trust the operation of these vehicles that utilize new technology. For example, many HEVs incorporate gauges that attempt to provide the driver with information on the various hybrid driving states. Some gauges will indicate to the driver when the vehicle is being propelled by the engine alone, the motor alone, or a combination of the two. Similarly, a display may indicate when the motor is operating as a generator, and is recharging an energy storage device, such as a battery.

It is known that some drivers may not be able to achieve desired fuel economy or energy efficiency numbers, in part because of driving habits. In many cases, drivers are willing to modify their behavior, but are unable to translate recommended techniques into real changes in their driving habits. With the increase in sensing electronics, computers and other related technology on board a vehicle, the amount of information that can be communicated to the driver is virtually limitless. Often, the driver may not even know of all the features and capabilities their vehicle has to offer. Utilizing human-machine interfaces (HMI) to convey or display certain types of information, particularly information relevant to HEVs, PHEVs or BEVs, can help facilitate economical driving choices.

SUMMARY

According to one or more embodiments of the present disclosure, a vehicle interface system is provided. The system includes an interface for communicating with a vehicle user. A controller is in communication with the interface. The controller is configured to retrieve data associated with at least one calendar event from a device of the user. The controller receives destination information based on the calendar event and prompts the user, via the interface, to verify the destination information. The controller is configured to receive verification of the destination information the destination information based on an input from the user via the interface. The controller receives arrival-time information based on the calendar event and prompts the user, via the interface, to verify the arrival-time information. The controller receives verification of the arrival-time information based on an input from the user via the interface. Trip information is generated based on the validated destination information and arrival-time information, and vehicle data. The trip information is communicated to the user via the interface.

In another embodiment, the interface includes a display. The controller is configured to communicate the trip information by displaying a route map on the display.

In a further embodiment, the interface includes a voice-recognition interface and the input includes a voice input.

In yet another embodiment, the device is a personal wireless device having an electronic calendar function.

In still another embodiment, upon a determination that at least one of the calendar event or the device are unavailable, the controller prompts the user to retrieve destination information and arrival-time information. The controller is configured to receive the destination information and arrival-time information from the user via the interface.

In a further embodiment, controller is configured to determine the trip information based on route data including at least one of map topology, weather, or traffic. The trip information is also based on vehicle data which includes at least one of a battery charge level, a driver profile information and a vehicle location.

According to one or more other embodiments of the present disclosure, a vehicle interface system is provided. The system includes an interface for communicating with a vehicle user. A controller is in communication with the interface and configured to retrieve a calendar event and verify the calendar event based on an input from the user via the interface. Trip information is generated based on the calendar event and vehicle data. The controller is configured to communicate the trip information based on the calendar event and vehicle data to the user via the interface.

According to one or more additional embodiments, a vehicle interface method is provided. The method includes retrieving a calendar event and validating the calendar event based on an input from a user via a vehicle interface. Trip information, based on the calendar event and vehicle data, is generated. The trip information is communicated to the user via the interface.

DETAILED DESCRIPTION

As required, detailed embodiments of the present disclosure are disclosed herein; however, it is to be understood that the disclosed embodiments are merely examples of an invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ one or more embodiments of the present application.

Figure 1:
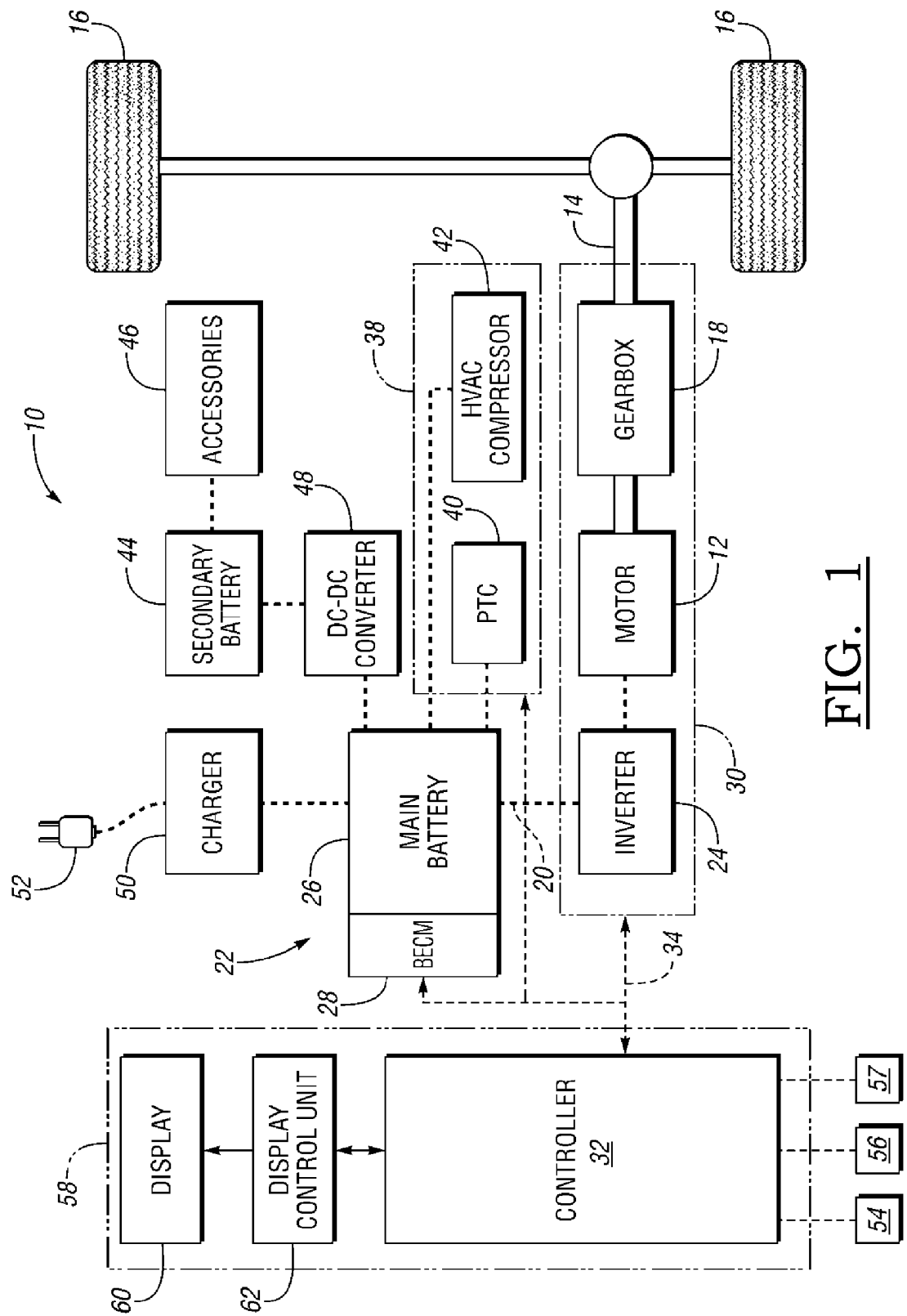
FIG. 1 is a simplified, exemplary schematic representation of a vehicle including an information display system according to one or more embodiments of the present disclosure.

Referring now to the drawings, FIG. 1 is a simplified, exemplary schematic representation of a vehicle 10 is illustrated. As seen therein, the vehicle 10 may be a battery electric vehicle (BEV), which is an all-electric vehicle propelled by one or more electric machines without assistance from an internal combustion engine. The one or more electric machines of the vehicle 10 may include a traction motor 12. The motor 12 may output torque to a shaft 14, which may be connected to a first set of vehicle drive wheels, or primary drive wheels 16, through a gearbox 18. Other vehicles within the scope of the present disclosure may have different electric machine arrangements, such as more than one traction motor. In the embodiment shown in FIG. 1, the traction motor 12 can be used as a motor to output torque to propel the vehicle 10. Alternatively, the motor 12 can also be used as a generator, outputting electrical power to a high voltage bus 20 and to an energy storage system 22 through an inverter 24.

The energy storage system 22 may include a main battery 26 and a battery energy control module (BECM) 28. The main battery 26 may be a high voltage battery that is capable of outputting electrical power to operate the motor 12. According to one or more embodiments, the main battery 26 may be a battery pack made up of several battery modules. Each battery module may contain a plurality of battery cells. The battery cells may be air cooled using existing vehicle cabin air. The battery cells may also be heated or cooled using a fluid coolant system. The BECM 28 may act as a controller for the main battery 26. The BECM 28 may also include an electronic monitoring system that manages temperature and state of charge of each of the battery cells. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 12, the gearbox 18, and the inverter 24 may generally be referred to as a transmission 30. To control the components of the transmission 30, a vehicle control system, shown generally as a vehicle controller 32, may be provided. Although it is shown as a single controller, it may include multiple controllers that may be used to control multiple vehicle systems. For example, the controller 32 may be a vehicle system controller (VSC) or powertrain control module (PCM). In this regard, the PCM portion of the may be software embedded within the VSC, or it can be a separate hardware device.

A controller area network (CAN) 34 may allow the controller 32 to communicate with the transmission 30 and the BECM 28. Just as the main battery 26 includes a BECM, other devices controlled by the controller 32 may have their own controllers or sub-controllers. For example, the transmission 30 may include a transmission control module (TCM) (not shown), configured to coordinate control of specific components within the transmission 30, such as the motor 12 and/or the inverter 24. For instance, the TCM may include a motor controller. The motor controller may monitor, among other things, the position, speed, power consumption and temperature of the motor 12. Using this information and a throttle command by the driver, the motor controller and the inverter 24 may convert the direct current (DC) voltage supply by the main battery 26 into signals that can be used to drive the motor 12. Some or all of these various controllers can make up a control system, which, for reference purposes, may be the controller 32.

Although illustrated and described in the context of the vehicle 10, which is a BEV, it is understood that embodiments of the present disclosure may be implemented on other types of vehicles, such as those powered by an internal combustion engine, either alone or in addition to one or more electric machines (e.g., HEVs, PHEVs, etc.).

The vehicle 10 may also include a climate control system 38. The climate control system 38 may include both heating and cooling components. For instance, the climate control system 38 may include a high voltage positive temperature coefficient (PTC) electric heater 40. The PTC 40 may be used to heat coolant that circulates to a passenger car heater. Heat from the PTC 40 may also be circulated to the main battery 26. The climate control system 38 may also include a high voltage electric HVAC compressor 42. Both the PTC 40 and the HVAC compressor 42 may draw electrical energy directly from the main battery 26. Moreover, the climate control system 38 may communicate with the controller 32. The on/off status of the climate control system 38 can be communicated to the controller 32, and can be based on, for example, the status of an operator actuated switch, or the automatic control of the climate control system 38 based on related functions such as window defrost.

In addition to the main battery 26, the vehicle 10 may include a separate, secondary battery 44, such as a typical 12-volt battery. The secondary battery 44 may be used to power various other vehicle accessories 46, such as headlights, and the like. A DC-to-DC converter 48 may be electrically interposed between the main battery 26 and the secondary battery 44. The DC-to-DC converter 48 may allow the main battery 26 to charge the secondary battery 44.

The vehicle 10, which is shown as a BEV, may further include an alternating current (AC) charger 50 for charging the main battery 26 using an off-vehicle AC source. The AC charger 50 may include power electronics used to convert the off-vehicle AC source from an electrical power grid to the DC voltage required by the main battery 26, thereby charging the main battery 26 to its full state of charge. The AC charger 50 may be able to accommodate one or more conventional voltage sources from an off-vehicle electrical grid (e.g., 110 volt, 220 volt, etc.). The AC charger 50 may be connected to the off-vehicle electrical grid using an adaptor, shown schematically in FIG. 1 as a plug 52.

Also shown in FIG. 1 are simplified schematic representations of a braking system 54, an acceleration system 56, and a navigation system 57. The braking system 54 may include such things as a brake pedal, position sensors, pressure sensors, or some combination of the two, as well as a mechanical connection to the vehicle wheels, such as the primary drive wheels 16, to effect friction braking. The braking system 54 may also include a regenerative braking system, wherein braking energy may be captured and stored as electrical energy in the main battery 26. Similarly, the acceleration system 56 may include an accelerator pedal having one or more sensors, which, like the sensors in the braking system 54, may communicate information such as throttle input to the controller 32.

The navigation system 57 may include a global positioning system (GPS) unit and a navigation user interface. The navigation user interface may include a navigation display and a navigation controller and inputs for receiving destination information or other data from a driver. The navigation system 57 may also communicate distance and/or location information associated with the vehicle 10, the vehicle's target destinations, or other relevant GPS waypoints. The controller 32 may communicate with each individual vehicle system to monitor and control vehicle operation according to programmed algorithms and control logic. In this regard, the controller 32 may help manage the different energy sources available and the mechanical power being delivered to the wheels 16 in order to maximize the vehicle's range. The controller 32 may also communicate with a driver as well.

In addition to the foregoing, the vehicle 10 may include an information interface system 58 to facilitate communications with a driver. As explained in detail below, the information interface system 58 may provide relevant vehicle content to a driver of the vehicle 10 before, during or after operation. As shown in FIG. 1, the information interface system 58 may include the controller 32 and an information display 60. The information interface system 58 may also include its own control system, which, for reference purposes, may be a display control unit 62. The display control unit 62 may communicate with the controller 32 and may perform control functions on the information display 60, although the controller 32 may also function as the information interface system 58.

The controller 32 may be configured to receive input that relates to current operating conditions of the vehicle 10. For instance, the controller 32 may receive input signals from the BECM 28, the transmission 30 (e.g., motor 12 and/or inverter 24), the climate control system 38, the braking system 54, the acceleration system 56, or the like. The controller 32 may provide output to the display control unit 62 such that the information display 60 conveys energy consumption and range information, or other information relating to the operation of the vehicle 10 to a driver.

The information display 60 may be disposed within a dashboard of the vehicle 10, such as an instrument panel or center console area. Moreover, the information display 60 may be part of another display system, such as the navigation system 57, or may be part of a dedicated information display system. The information display 60 may be a liquid crystal display (LCD), a plasma display, an organic light emitting display (OLED), or any other suitable display.

The information display 60 may include a touch screen interface for receiving driver input associated with selected areas of the information display 60. The information interface system 58 may also include one or more buttons, including hard keys or soft keys, located adjacent the information display 60 for effectuating driver input. The information interface system 58 may also include a voice recognition system for receiving voice inputs from the users through various microphones, for example. In addition, the information interface system 58 may include an audio system for relating audio information to the users. Other operator inputs known to one of ordinary skill in the art may also be employed without departing from the scope of the present disclosure.

Figure 2:
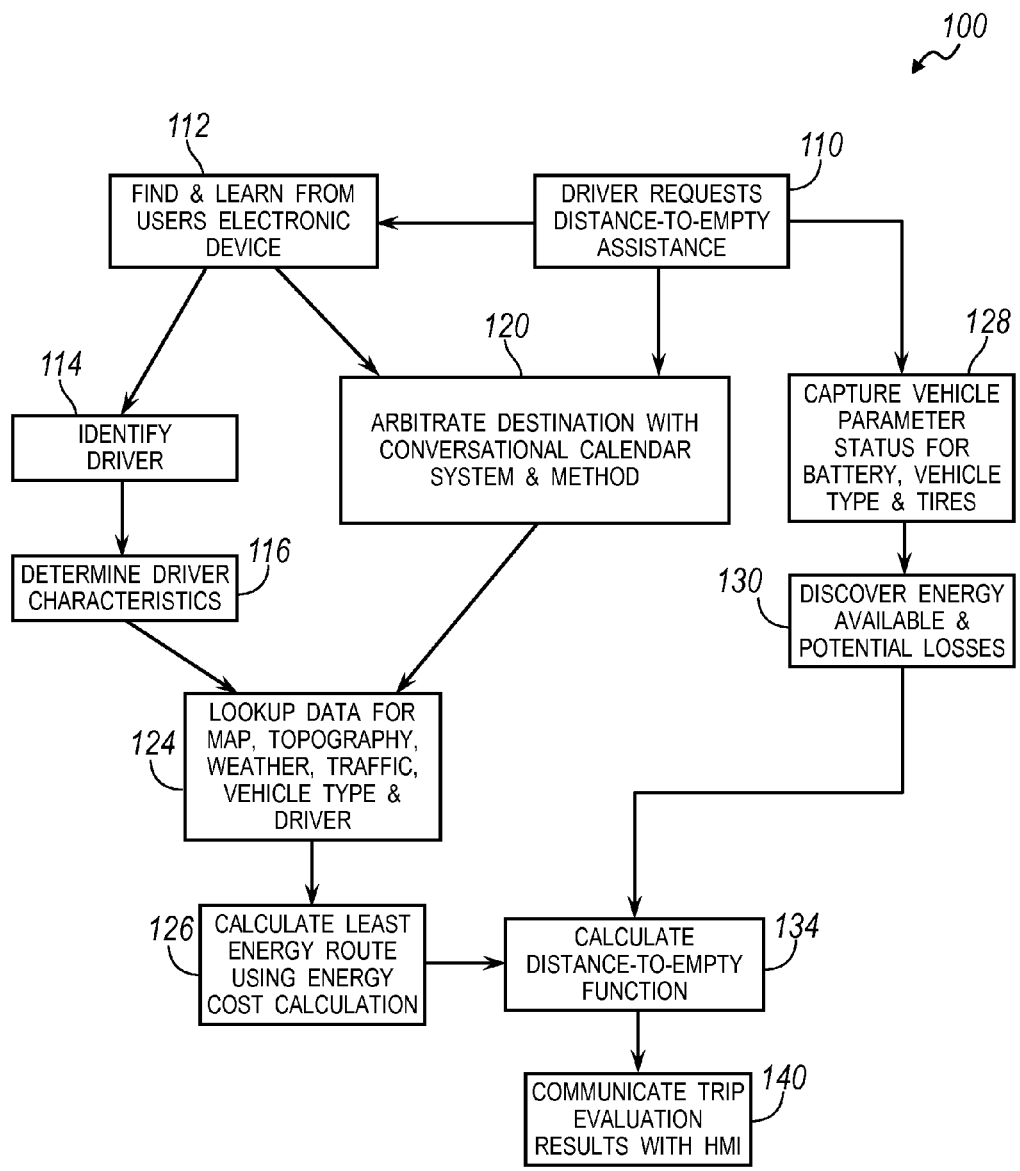
FIG. 2 is a simplified, exemplary flow chart depicting a method according to one or more embodiments of the present disclosure.

Referring to FIG. 2 is a flowchart illustration a high-level strategy for trip evaluation using trip data obtained from a conversational user interface. BEVs may have a limited range or distance that can be traveled before the main battery 26 is depleted. Drivers need to know whether the range of the BEV is sufficient based on the battery capacity. BEV's need to know the driver's itinerary or calendar schedule prior to starting the trip. If the BEV knows the destination and required arrival time of a given calendar event, or series of events, the BEV may plan a trip to optimize energy consumption as well as minimize travel time to each calendar event while ensuring the driver is able to make it a final location to recharge the main battery 26 within the vehicle's range.

Accordingly, the range of a vehicle may also be referred to as its distance to empty (DTE) value. The DTE value is calculated based on a variety of factors and algorithms based on several different engineering disciplines. Unlike a conventional vehicle and a fuel gauge, the BEV's distance to empty calculation can be drastically affected by traffic, road selection, weather, terrain, or driving style, for example, making it more difficult for a driver to estimate the DTE value.

FIG. 2 illustrates a strategy 100 for evaluating a trip when a driver requests assistance using the DTE calculations, as represented by block 110. The driver request may be implied by the controller 32 automatically receiving destination and required arrival-time information based on a calendar event or itinerary. Similarly, destination and required arrival-time information may be manually input by the user.

In the situation where the driver has an electronic device, the vehicle 10 connects to the driver's electronic device, as represented by block 112. A personal electronic device may include a mobile phone, smart phone, PDA or any wireless device with network connectivity and having electronic calendar function. The personal electronic device may communicate with the vehicle 10 via a wireless remote network, such as a BLUETOOTH™ wireless network, an optical network, or any other suitable communication network. The electronic device may also be connected physically to the controller 32 through a USB connector or physical data port, for example By connecting to the driver's electronic device, the controller 32 can find and learn information and about the driver and the driver's itinerary. If the personal device includes an electronic calendar, the controller 32 is able to access the driver's calendar events and itinerary automatically. The controller 32 may also be able to obtain other information from the electronic device.

Along these lines, the controller 32 determines the identity the driver, as represented by block 114. The controller 32 may determine the driver identity based on the information on the personal electronic device. How the vehicle 10 is driven can be an important factor in determining how long the remaining charge in the main battery 26 will last. For instance, aggressive driving behavior may deplete the main battery 26 more rapidly than relatively conservative driving behavior. To this end, the operation of the vehicle 10 may be continuously monitored and analyzed in order to determine the impact of driving behavior on the vehicle's range. The controller 32 may take into account past driving behavior, current driving behavior, or predicted future driving behavior.

The driver profile may correspond to a theoretical or global average for all types of drivers. The driver profile may also to an estimated average for the vehicle 10. The vehicle's average profile may correspond to a lifetime average or an average for a past distance traveled, period of time or some other relevant event.

In another embodiment each driver of the vehicle 10 may be assigned a key ID identifying a driver profile to the controller 32. This may allow driver preferences, setting or other profile information, such as an average energy consumption profile, to be stored and recalled for each driver. The key ID may be input to the vehicle either actively or passively at startup. For example, each driver may manually enter a code associated with their key ID. Alternatively, the key ID may be automatically transmitted to the controller 32 using radio frequency (RF) technology. In particular, the key ID may be an RFID stored in a driver's key or key fob that, when interrogated, transmits the driver's ID to the controller 32.

Based on the identity of the driver, the controller 32 determines the driver's characteristics, as represented by block 116. The controller 32 may take into account past driving behavior, current driving behavior and store a driver profile to determine how future driving behavior may affect the vehicle's energy consumption or deplete the main battery 26 prior to reaching an intended locations, such as the next calendar event, a charge point, the final destination, or a combination of locations along the itinerary.

The controller 32 also communicates with the driver and/or a driver's personal electronic device to arbitrate the intended destination, as represented by block 120. The conversational user interface system and method based on the calendar event will be in more detail with regard to FIG. 3.

As represented by block 124, the controller 32 may also take into account environmental factors such as weather, traffic, or topography/terrain which indicates changes in elevation, or example. The controller 32 uses forecasts of the weather and traffic, as well as knowledge of the topography to estimate how far the remaining charge will take a vehicle along any specific route to the intended destination. Estimates of the accuracy of these forecasts can also be made using mathematical models of forecast accuracy. Further, the controller 32 may be able to receive estimates of the forecast data can also be made to represent, for example, turbulence of wind flows and variability in micro-traffic conditions. The controller may receive the environmental data from numerous sources such as vehicle-to-vehicle communication networks, stored data, such as topographic map data, telecommunication networks, or broadcast networks to which the vehicle subscribes. Of course, any suitable method for receiving and/or looking up particular environmental data may be utilized.

Based on the environmental data, the controller can calculate the least energy route, as represented by block 128. The least energy route may be calculated based on an energy-cost formula or algorithm that takes into account the numerous environmental factors that may affect that amount of energy required along a particular route. In addition, the energy-cost calculation may take into account the calendar event time to ensure the driver makes it to the destination on-time, or within an acceptable time window.

The controller 32 also captures the status of vehicle parameters that may affect the DTE, as represented by block 128. Vehicle parameters such as the state of charge of the battery 26 or tire pressure and friction, vehicle weight, for example can be provided. The controller 32 may also obtain the battery performance characteristics and active charging or discharge rate or other relevant information regarding the vehicle. The vehicle parameters can be provided the controller 32 by the vehicle through a vehicle network, or the vehicle information may be stored in a remote location such as on a remote server and be provided to the controller.

Based on the vehicle parameters, the controller 32 can determine the available energy as well as potential losses, as represented by block 130. Available energy includes the stored energy in the battery. Potential losses may include frictional losses associated with tire pressure, or energy losses from running accessories such as air conditioning.

In addition to calculating the least energy route in block 126 using vehicle routing problem solutions with the energy cost function based on topography/terrain, weather, traffic, vehicle type and driver characteristics; the controller calculates the DTE function, as represented by block 134. The DTE calculation uses all the data and variables collected by the controller 32 to determine if the route completion based on the driver's itinerary is likely or not. For example, the DTE function uses destination and arrival-time information automatically extracted from the user's calendar. The DTE function may also acquire necessary vehicle status information and all drive information along with driver profile information to obtain the low energy route. The DTE program can also process the battery model based on retrieved parameters.

Finally, the controller 32 reports to the user the trip evaluation results, as represented by block 140. The controller communicates the trip evaluation results to the driver via the information interface system 58. The trip evaluation results may include the preferred detailed route. The trip results may also include necessary estimations of power available during and at the end of the itinerary.

Figure 3:
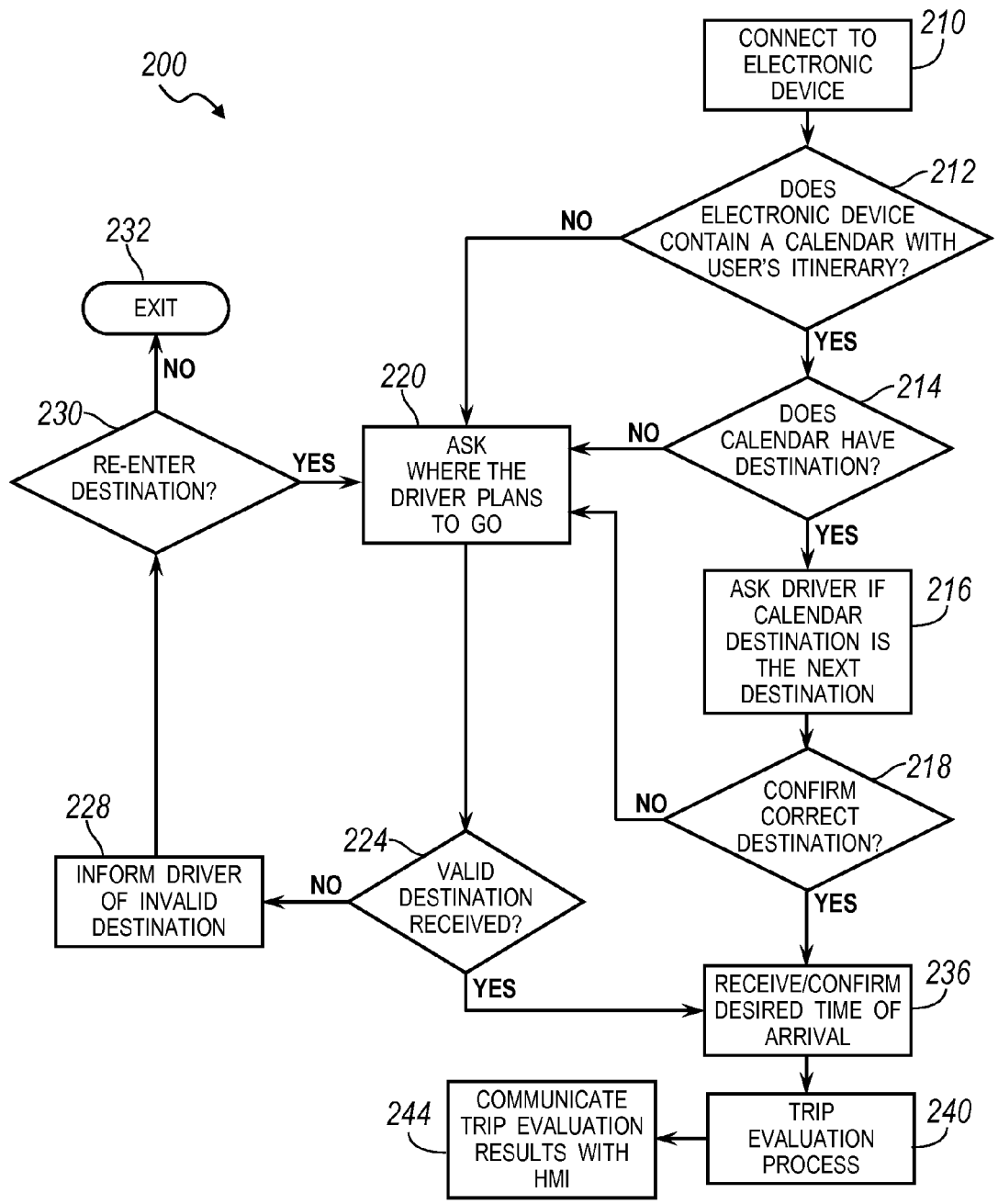
FIG. 3 is another simplified, exemplary flow chart depicting a method according to one or more embodiments of the present disclosure.

FIG. 3 illustrates the trip planning method 200 using a user interface. Initially, the controller 32 connects to an electronic device, as represented by block 210. The electronic device may be a personal electronic device such as a mobile phone, smart phone, PDA or any wireless device with network connectivity and having electronic calendar function. The controller 32 may connect to the electronic device when the driver enters the vehicle with the personal electronic device using a BLUETOOTH™ or other wireless transceiver, for example.

Alternatively, the electronic device may be a remote device or server with an electronic calendar application or calendar data. The controller 32 may connect to the remote device prior to the driver entering the vehicle. For example, the device may be a remote computer or server which the controller 32 accesses via a cellular, WiFi or cloud network, for example, however any suitable wireless communication with the remote device is contemplated. Enabling the controller 32 to access the driver's electronic device and calendar allows the DTE function and least-energy route calculations to be determined in advance, thereby saving time, and possibly driving energy.

Once the controller 32 connects to the electronic device, the controller 32 determines whether the electronic device contains a calendar or calendar data with the user's itinerary, as represented by block 212.

If the controller 32 determines the electronic device contains a calendar, the controller 32 determines whether the calendar includes an event with a destination, as represented by block 214. In one embodiment, the calendar function may include a plurality of calendar events which define an itinerary. The controller 32 may confirm the itinerary of destinations.

If the calendar event does contain a destination, the controller 32 asks the driver whether the calendar destination is the next destination, as represented by block 216. The controller 32 confirms the calendar destination is correct, as represented by block 218.

The controller 32 may also ask the driver the where the driver plans to go or the planned destination, as represented by block 220. The controller 32 may prompt the driver for the planned destination under several different circumstances. For example, if the electronic device does not have a calendar, as represented by block 212, or the calendar does not have a destination, as represented by block 214, the controller 32 communicates with the driver and asks where the driver plans to go, as represented by block 220. The controller 32 may also ask the driver the next destination if the driver does not confirm the calendar destination is correct, from block 218.

The controller 32 communicates with the user through the information interface system 58. As previously discussed, the interface system 58 may also include an information display, input buttons or keys, an audio system and a voice recognition system for providing information and receiving inputs from the driver.

The controller 32 confirms the driver's planned destination is correct and is a valid destination, as represented by block 224. If the destination received by the driver is an invalid destination or is incorrect, the controller 32 informs the driver of the invalid destination, as represented by block 228. The controller 32 asks the driver if they would like to re-input a destination, as represented by block 230. In the event the driver does not wish to input a destination, the conversational calendar method will exit, as represented by block 232. Once the conversational calendar method is exited, the driver may navigate without any route-guidance assistance or DTE assistance.

Once the controller 32 receives a valid destination that is confirmed by the driver, the controller 32 also determines the desired time of arrival at the planned destination, as required by block 236. The controller 32 may receive the arrival time from calendar event on the electronic device. The controller 32 may also ask the driver the desired arrival-time and receive input through the interface system 58.

Knowing the planned destination and desired arrival-time, the controller 32 completes a trip evaluation process, as represented by block 240. The trip evaluation process may include calculating the least energy route and calculating the DTE, as discussed in FIG. 2. The trip evaluation results are then communicated to the user, as represented by block 244.

References to the controller 32 may correspond generally to any number of vehicle controllers or vehicle associated computing systems capable of performing the methods described herein. As previously described, the controller 32 may include a VSC/PCM, vehicle control unit, motor control unit, display control unit or a remote computing system in communication with the a vehicle control unit, or the like. It should also be noted that the methods described in FIG. 2 and FIG. 3 are only examples, and that the functions or steps of the method could be undertaken other than in the order described and/or simultaneously as may be desired, permitted and/or possible.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle interface system comprising:
an interface of a vehicle for communicating with a vehicle user; and
a controller of the vehicle in communication with the interface and configured to:
connect to a mobile device carried by the vehicle user responsive to the vehicle user entering the vehicle;
once connected, retrieve data associated with a calendar event from the mobile device, the data including a destination location and an arrival time at which the calendar event occurs;
prompt the user, via the interface, to verify the destination location of the calendar event before generating trip information;
receive verification of the destination location based on an input from the user via the interface;
prompt the user, via the interface, to verify the arrival time of the calendar event before generating the trip information;
receive verification of the arrival time based on an input from the user via the interface;
identify a driver profile corresponding to the vehicle user based on information received from the mobile device, the driver profile indicating driving behavior of the vehicle user affecting vehicle range;
generate the trip information based on the validated destination location, the arrival time, the driver profile, and vehicle data; and
communicate the trip information to the user via the interface.

2. The system of claim 1 wherein the interface includes a display and wherein the controller being configured to communicate the trip information includes being configured to display a route map on the display.

3. The system of claim 1 wherein the interface includes a voice-recognition interface and wherein the input includes a voice input.

4. The system of claim 1 wherein the device is a personal wireless device having an electronic calendar function.

5. The system of claim 1 wherein upon a determination that at least one of the calendar event or the device are unavailable, the controller is configured to:
prompt the user to retrieve destination location information and arrival-time information; and
receive the destination location information and arrival-time information from the user via the interface.

6. The system of claim 1 wherein the controller is configured to determine the trip information based on route data including at least one of map topology, weather, or traffic and wherein the vehicle data includes at least one of a battery charge level, a driver profile information and a vehicle location.

7. A vehicle interface system comprising:
an interface for communicating with a vehicle user; and
a controller of a vehicle in communication with the interface and configured to:
retrieve a calendar event responsive to connection of the vehicle to a mobile device carried by the vehicle user entering the vehicle;
verify correctness of destination location information of the calendar event before generating trip information for the vehicle based on input received from the user via the interface;
identify a driver profile corresponding to the vehicle user based on information received from the mobile device, the driver profile indicating driving behavior of the vehicle user affecting vehicle range;
generate the trip information based on the calendar event, the driver profile, and vehicle data; and
communicate the trip information based on the calendar event and vehicle data to the user via the interface.

8. The system of claim 7 wherein the controller being configured to retrieve the calendar event includes the controller being configured to:
query the user to retrieve the destination location information and an arrival time; and
receive the destination location information and the arrival time from the user via the interface.

9. The system of claim 7 wherein the controller is further configured to receive the destination location information and an arrival time based on the calendar event.

10. The system of claim 9 wherein the controller is further configured to validate the destination location information and the arrival time based on an input from the user via the interface.

11. The system of claim 7 wherein the interface includes a display and wherein the controller being configured to communicate the trip information includes the controller being configured to display a route map on the display.

12. The system of claim 7 wherein the interface includes a voice-recognition interface and wherein the input includes a voice input.

13. The system of claim 7 wherein the controller is further configured to retrieve the calendar event from a device of the user, where the device is at least one of a personal wireless device or a remote system having an electronic calendar function and configured to being accessible by the controller.

14. The system of claim 7 wherein the controller configured to retrieve a calendar event comprises the controller being configured to retrieve a plurality of calendar events defining an itinerary.

15. The system of claim 7 wherein the vehicle data includes at least one of a battery charge level, a driver profile information and a vehicle location.

16. The system of claim 7, wherein the vehicle data includes a battery charge level of a battery of the vehicle, and the controller is further configured to generate the trip information based on a remaining range of the vehicle before the battery is depleted, as determined according to the driver profile and the battery charge level.

17. A method comprising:
- retrieving a calendar event responsive to connection of a vehicle to a mobile device carried by an entering user;
- validating correctness of destination location information of the calendar event based on input received from the user via a vehicle interface, before generating the trip information based on the calendar event and a driver profile defining driving behavior of the user affecting vehicle range; and
- communicating the trip information to the interface.

18. The method of claim 17 wherein retrieving the calendar event includes:
- querying the user to retrieve the destination location information and an arrival time; and
- receiving the destination location information and the arrival time from the user via the interface.

19. The method of claim 17 wherein retrieving the calendar event includes retrieving the calendar event from the mobile device of the user.

20. The method of claim 19 further comprising validating the destination location information and arrival time of the calendar event based on an input from the user via the interface.

* * * * *

UNITED STATES PATENT AND TRADEMARK OFFICE
CERTIFICATE OF CORRECTION

PATENT NO. : 9,121,710 B2  
APPLICATION NO. : 13/801584  
DATED : September 1, 2015  
INVENTOR(S) : Oleg Yurievitch Gusikhin et al.

Page 1 of 1

It is certified that error appears in the above-identified patent and that said Letters Patent is hereby corrected as shown below:

Claims

Column 11, Line 15, Claim 17:

After "before generating"  
Delete "the".

Signed and Sealed this  
Second Day of February, 2016

Michelle K. Lee  
*Director of the United States Patent and Trademark Office*